(12) United States Patent
Saito et al.

(10) Patent No.: US 6,694,232 B2
(45) Date of Patent: Feb. 17, 2004

(54) CONTROL DEVICE FOR HYBRID VEHICLE

(75) Inventors: Osamu Saito, Shioya-gun (JP); Yusuke Tatara, Tokyo (JP); Masao Kubodera, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/457,568

(22) Filed: Jun. 10, 2003

(65) Prior Publication Data
US 2003/0236599 A1 Dec. 25, 2003

(30) Foreign Application Priority Data
Jun. 19, 2002 (JP) ......................................... 2002-178838

(51) Int. Cl.[7] ............................................. G06F 17/00
(52) U.S. Cl. ............................. 701/22; 60/698; 60/706; 318/706; 180/65.1
(58) Field of Search .............................. 701/22; 60/698, 60/706; 318/139, 140, 149; 180/65.1, 65.3, 65.5; 123/198 F

(56) References Cited

U.S. PATENT DOCUMENTS 5,732,676 A * 3/1998 Weisman et al. ........... 123/436
6,230,496 B1 * 5/2001 Hofmann et al. ............. 60/706
6,568,355 B2 * 5/2003 Suzuki .......................... 123/2
6,621,244 B1 * 9/2003 Kiyomiya et al. .......... 318/611

FOREIGN PATENT DOCUMENTS

JP  2001-169406  6/2001

* cited by examiner

Primary Examiner—William A. Cuchlinski, Jr.
Assistant Examiner—Olga Hernandez
(74) Attorney, Agent, or Firm—Arent Fox Kintner Plotkin & Kahn, PLLC

(57) ABSTRACT

A control device for a hybrid vehicle which comprises an engine and a motor-generator that is capable of generating electrical power as power sources, and in which the power of at least one of the engine and the motor-generator is transmitted to an output shaft for driving the hybrid vehicle. The control device comprises a battery which is capable of supplying energy to the motor-generator, a state of charge measuring section for measuring the state of charge of the battery, and a drive control section that preliminarily stores information of a motor drive permissible vehicle speed below which a motor drive mode, in which the engine outputs no power and the motor is operated solely for driving the hybrid vehicle, is employed. The drive control section is adapted to control so to increase the motor drive permissible vehicle speed when the state of charge of the battery measured by the state of charge measuring section is equal to or greater than a predetermined value.

9 Claims, 6 Drawing Sheets

CONTROL DEVICE FOR HYBRID VEHICLE

BACKGROUND OF THE INVENTION

1. Field of the Invention

The present invention relates to a control device for a hybrid vehicle.

2. Description of the Related Art

Conventionally, in a hybrid vehicle which comprises an engine and a motor that is capable of generating electrical power (hereinafter referred to as a "motor-generator") as power sources, and in which the power of at least one of the engine and the motor-generator is transmitted to an output shaft for driving the hybrid vehicle, when a state of charge of a battery (hereinafter simply referred to as "SOC") as an energy storage means is in a normal state, a control operation is executed in such a manner that the drive mode of the hybrid vehicle is switched between an engine drive mode and a motor drive mode depending on a vehicle speed, a running resistance, and an opening degree of a throttle so as to obtain high efficiency.

Moreover, in such a hybrid vehicle, the power of driving wheels during deceleration is transmitted to the motor-generator so as to convert deceleration energy into regenerated energy, and the regenerated energy, as electrical energy, is stored in a battery device (see, for example, Japanese Unexamined Patent Application, First Publication No. 2001-169406). Conventionally, in such a case, a control operation is executed so that the amount of regenerated energy is restrained in order to protect the battery when the SOC of the battery is above a predetermined value.

However, when the amount of regenerated energy is restrained as mentioned above, degree of deceleration of the vehicle is decreased as shown in FIG. 8, and a problem is encountered in that the driver experiences unnatural sensations.

Moreover, when the amount of regeneration is restrained, the amount of regenerated energy is reduced, and energy at braking operations is dissipated as heat. As a result, a problem is encountered in that fuel economy is degraded.

SUMMARY OF THE INVENTION

Based on the above circumstances, an object of the present invention is to provide a control device for a hybrid vehicle, which enables restraining decrease in degree of deceleration of the vehicle during a regenerative operation.

Another object of the present invention is to provide a control device for a hybrid vehicle, which enables improvement in fuel economy by broadening a motor drive zone, and by increasing the amount of regenerated energy.

In order to achieve the above objects, the present invention provides a control device for a hybrid vehicle which comprises an engine and a motor that is capable of generating electrical power as power sources, and in which the power of at least one of the engine and the motor is transmitted to an output shaft for driving the hybrid vehicle, the control device comprising: an energy storage section which is capable of supplying energy to the motor; a state of charge measuring section for measuring the state of charge of the energy storage section; and a drive control section that preliminarily stores information of a motor drive permissible vehicle speed below which a motor drive mode, in which the engine outputs no power and the motor is operated solely for driving the hybrid vehicle, is employed, wherein the drive control section is adapted to control so to increase the motor drive permissible vehicle speed when the state of charge of the energy storage section measured by the state of charge measuring section is equal to or greater than a predetermined value.

According to the control device for a hybrid vehicle configured as described above, it is possible to broaden a drive zone in which the vehicle is driven solely by the power of the motor (hereinafter this zone is referred to as a "motor drive zone"), and as a result, regenerated energy can be recovered without decreasing the amount of regeneration.

In the above control device, the engine may be adapted to perform a cylinder deactivation operation, in which the operations of associated intake and exhaust valves are suspended, on at least some of cylinders thereof in the motor drive mode in which the engine outputs no power.

According to the control device configured as described above, it is possible to reduce pumping loss in the engine, and thus it is possible to reduce engine friction when the vehicle is driven by the motor.

Note that the cylinder deactivation operation may be applied to all of the cylinders, or alternatively, may be applied to some of the cylinders.

In the above control device, the motor drive permissible vehicle speed may be set so as to be gradually increased as the state of charge of the energy storage section increases.

According to the control device configured as described above, the state of charge of the energy storage section may be prevented from being excessively reduced due to drive by the motor at a high vehicle speed when the state of charge of the energy storage section is at a low level.

In the above control device, the drive control section may be further adapted to control so as to lower the motor drive permissible vehicle speed to the level before being increased when the state of charge of the energy storage section measured by the state of charge measuring section becomes less than the state of charge corresponding to the motor drive permissible vehicle speed after being increased.

According to the control device configured as described above, it is possible to set the motor drive permissible vehicle speed to the level before being increased when the state of charge is reduced.

In the above control device, the state of charge corresponding to the motor drive permissible vehicle speed after being increased may be provided with hysteresis that is set depending on the motor drive permissible vehicle speed.

According to the control device configured as described above, it is possible to reduce the state of charge of the energy storage section by at least an amount corresponding to hysteresis when the motor drive mode is selected based on the increased motor drive permissible vehicle speed. In addition, a hunting phenomenon, in which the drive mode is frequently switched into the motor drive mode and switched out of the motor drive mode, may be avoided.

In the above control device, a motor drive permissible period after the motor drive permissible vehicle speed is increased may be preliminarily set depending on the vehicle speed and the state of charge of the energy storage section. Here, the "motor drive permissible period" means time during which single and continuous drive by the motor is permitted.

According to the control device configured as described above, because energy consumed in the motor drive mode is determined depending on the vehicle speed and the motor drive permissible period, the state of charge of the energy storage section after executing drive by the motor may be set in advance.

The present invention further provides a control device for a hybrid vehicle which comprises an engine and a motor that is capable of generating electrical power as power sources, and in which the power of at least one of the engine and the motor is transmitted to an output shaft for driving the hybrid vehicle, the control device comprising: an energy storage section which is capable of supplying energy to the motor; a state of charge measuring section for measuring the state of charge of the energy storage section; a cylinder deactivation executing section which executes a cylinder deactivation operation on at least some of cylinders of the engine by suspending the operations of associated intake and exhaust valves; and a drive control section which is adapted to control the cylinder deactivation executing section, when the motor performs a regenerative operation during deceleration of the hybrid vehicle, so as to execute a cylinder deactivation operation when the state of charge of the energy storage section measured by the state of charge measuring section is equal to or less than a predetermined value, and so as to prohibit a cylinder deactivation operation when the state of charge of the energy storage section measured by the state of charge measuring section is greater than the predetermined value.

According to the control device for a hybrid vehicle configured as described above, when the state of charge of the energy storage section is at a low level during regenerative deceleration, it is possible to reduce pumping loss in the engine by executing the cylinder deactivation operation, and thus it is possible to increase regenerated energy by an amount corresponding to the reduced pumping loss. On the other hand, when the state of charge of the energy storage section is at a high level during regenerative deceleration, it is possible to increase pumping loss in the engine by prohibiting the cylinder deactivation operation, and thus it is possible to increase degree of deceleration of the vehicle.

Note that the cylinder deactivation operation may be applied to all of the cylinders, or alternatively, may be applied to some of the cylinders.

In the above control device, the drive control section may be further adapted to set the amount of regeneration, when the cylinder deactivation executing section is prohibited to execute a cylinder deactivation operation, to be less than that in a state in which the state of charge is equal to or less than the predetermined value.

According to the control device configured as described above, increase in the engine friction due to prohibition of cylinder deactivation operation may be compensated for by decreasing the amount of regeneration. Note that the amount of regeneration may be controlled by a regenerative output control section.

In the above control device, the drive control section may be further adapted to gradually decrease the amount of regeneration as the state of charge of the energy storage section increases.

According to the control device configured as described above, the increasing rate of the state of charge of the energy storage section may be slowed down.

DESCRIPTION OF THE PREFERRED EMBODIMENTS

Preferred embodiments of a control device for a hybrid vehicle according to the present invention will now be explained with reference to FIGS. 1 to 7.

First Embodiment

A first embodiment of the present invention will be explained below with reference to FIGS. 1 to 5.

Figure 1:
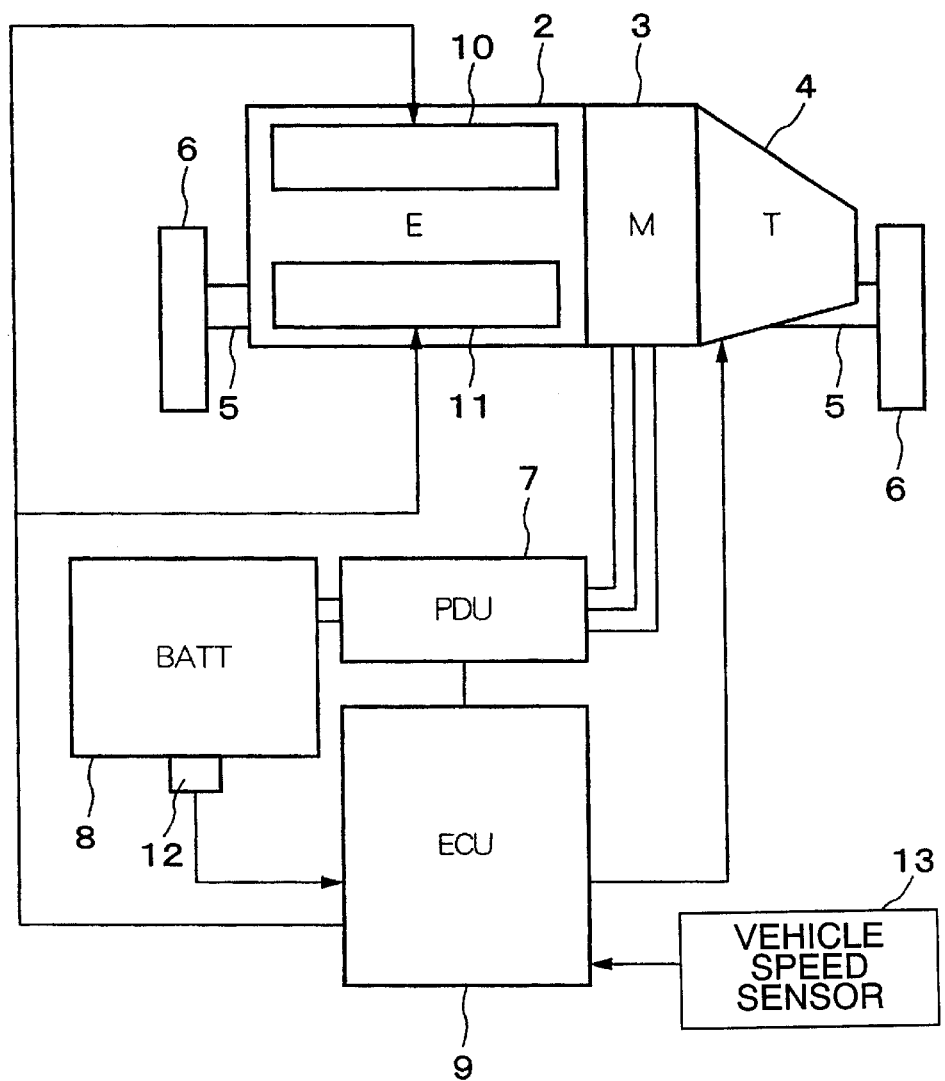
FIG. 1 is a schematic diagram showing the general structure of a power transmission system of a hybrid vehicle having a control device according to the present invention.

FIG. 1 is a schematic diagram showing the general structure of a power transmission system of a hybrid vehicle according to the present invention.

In this hybrid vehicle, an engine 2 and an electric motor 3 that is capable of generating electrical power (hereinafter referred to as a "motor-generator") are directly coupled to each other in series, and the power of at least one of the engine 2 and the motor-generator 3 is transmitted to driving wheels 6 of the hybrid vehicle via a transmission 4 and an output shaft 5.

When the driving force is transmitted from the driving wheels 6 to the motor-generator 3 during deceleration of the hybrid vehicle, the motor-generator 3 acts as a generator for applying a so-called regenerative braking force to the vehicle, i.e., the kinetic energy of the vehicle is recovered and stored in a battery 8 as electric energy via a power drive unit (PDU) 7.

The regenerative output is controlled by an ECU 9 via the PDU 7. Accordingly, the PDU 7 forms a regenerative output control section.

The motor-generator 3 is driven by electrical energy stored in the battery 8, and the driving power is controlled by the ECU 9 via the PDU 7. The battery 8 may be replaced by a capacitor.

The engine 2 is of a multi-cylinder reciprocating type, and comprises intake and exhaust valves for executing intake and exhaust operations in the cylinders, an intake and exhaust control device (a cylinder deactivation executing section) 10 for controlling the operations of the intake and exhaust valves of each of the cylinders, and a fuel injection and ignition control device 11 for controlling fuel injection and ignition of injected fuel for each of the cylinders. The intake and exhaust control device 10 and the fuel injection and ignition control device 11 are controlled by the ECU 9.

The hybrid vehicle is configured such that a fuel cut control operation is executed, as necessary, in which fuel supply to all of the cylinders of the engine 2 is paused by the fuel injection and ignition control device 11, and a cylinder deactivation control operation is executed, as necessary, in which the intake and exhaust valves of all of the cylinders of the engine 2 are maintained to be closed by the intake and exhaust control device 10.

The ECU 9 is provided with a signal from a state of charge measuring section 12 which measures a state of charge (hereinafter simply referred to as "SOC",) of the battery 8, and a signal from a vehicle speed sensor 13 which measures a vehicle speed.

The drive mode of the hybrid vehicle configured as described above comprises a cruise mode including a motor cruise mode and a cruise charging mode, a motor assist mode, and a regenerative deceleration mode.

The motor cruise mode is a drive mode in which the motor-generator 3 is used as a motor for solely driving the vehicle, and the fuel cut control operation is applied to the engine 2 along with the cylinder deactivation control operation for reducing pumping loss of the engine 2.

The cruise charging mode is a drive mode in which the engine 2 is operated for driving the vehicle, and the motor-generator 3 is used as a generator for converting a portion of the power of the engine 2 into electrical energy that is charged into the battery 8.

The motor assist mode is a drive mode in which the engine 2 is operated and the motor-generator 3 is used as a motor so that the vehicle is driven by the powers of the engine 2 and motor-generator 3.

The regenerative deceleration mode is a drive mode during deceleration of the vehicle in which the motor-generator 3 is used as a generator for executing a regenerative operation so as to convert deceleration kinetic energy into regenerated energy that is charged into the battery 8 as electrical energy.

Figure 2:
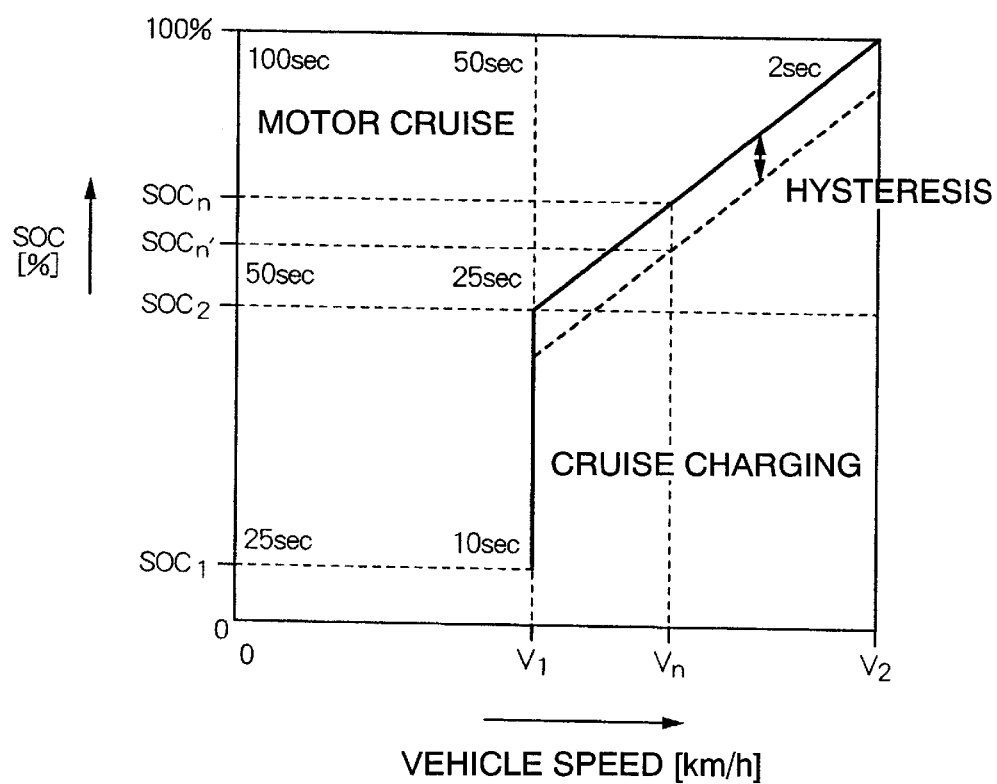
FIG. 2 is a diagram showing an example of a motor cruise map used in a first embodiment of the control device for a hybrid vehicle according to the present invention.

In the cruise mode, a control operation is executed such that the motor cruise mode is selected when the vehicle speed is equal to or lower than a preliminarily determined motor drive permissible vehicle speed, and the cruise charging mode is selected when the vehicle speed is higher than the motor drive permissible vehicle speed. FIG. 2 is a diagram showing an example of a motor cruise map in which, as indicated by a solid-bold line, the motor drive permissible vehicle speed is set constants i.e., set to be an initial value VI (e.g., 50 km/h) corresponding to the SOC of the battery 8 ranging from a lowest SOC (hereinafter referred to as "SOC1") to a permissible vehicle speed changing SOC (hereinafter referred to as "SOC2"), and the motor drive permissible vehicle speed is set so as to increase as the SOC increases when the SOC of the battery 8 exceeds the SOC2. In other words, the motor drive permissible vehicle speed is increased when the SOC of the battery 8 is greater than the SOC2 (a predetermined value).

In the following description, the SOC corresponding to the motor drive permissible vehicle speed in a zone in which the motor drive permissible vehicle speed varies (i.e., a zone above the SOC2) is referred to as "vehicle speed setting SOC" for convenience. As indicated by a broken-bold line in FIG. 2, the vehicle speed setting SOC has hysteresis having a predetermined amount in the direction along which the SOC decreases. The amount (width) of hysteresis will be explained below in detail.

In addition, in the motor cruise map, a motor drive permissible period is set in advance depending on the SOC and the vehicle speed. For example, the motor drive permissible period is set to be 2 seconds corresponding to the SOC of 100% and the vehicle speed of V2 and, and the motor drive permissible period is set to be 25 seconds corresponding to the SOC of SOC2 and the vehicle speed of V1 (V2>V1). Here, the "motor drive permissible period" means time during which single and continuous drive by the motor is permitted.

Figure 3:
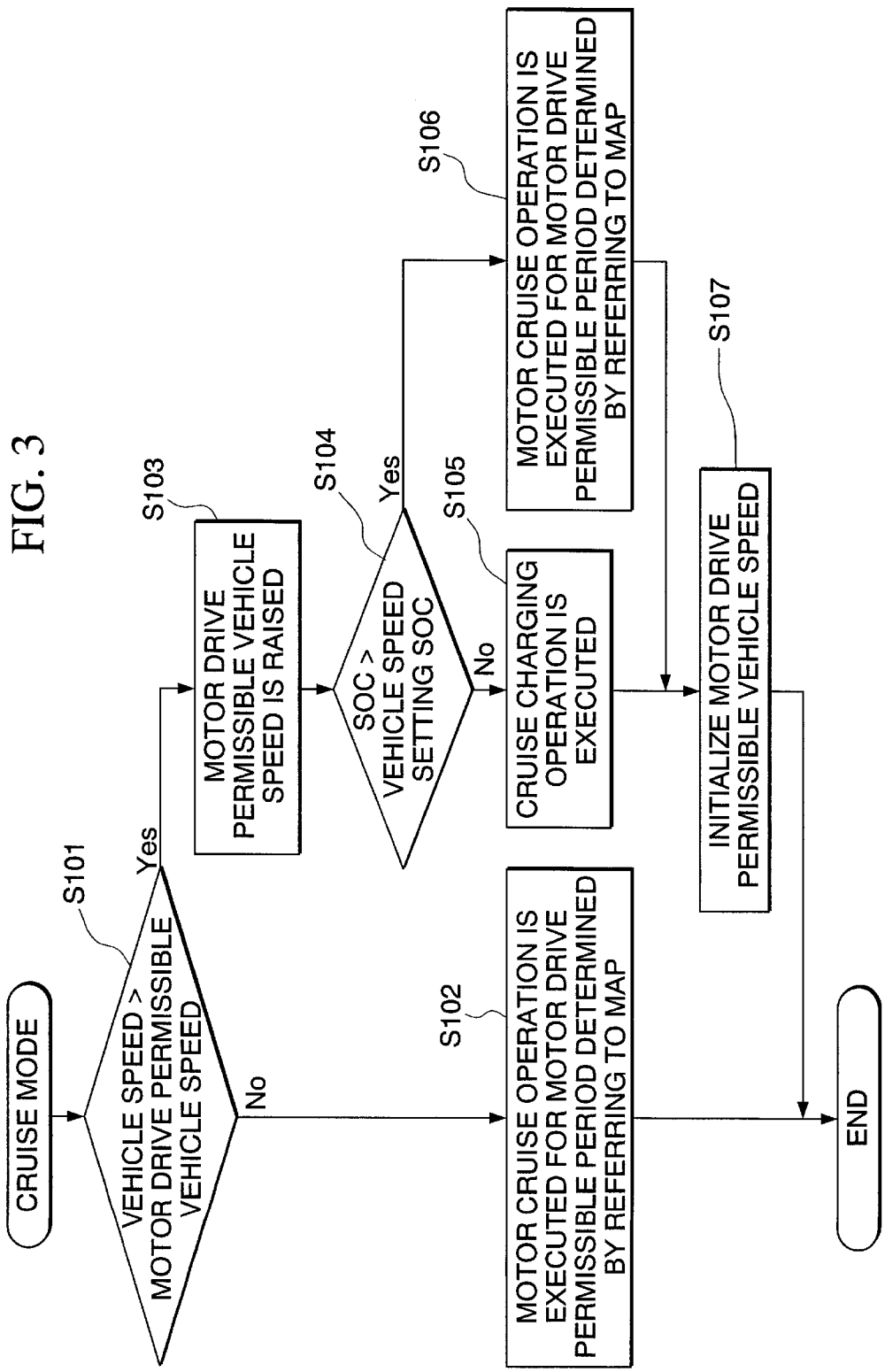
FIG. 3 is a flowchart showing a cruise control operation in the first embodiment.

Next, a cruise control operation will be explained with reference to a flowchart shown in FIG. 3.

In step S101 in the cruise mode, it is determined whether the present vehicle speed measured by the vehicle speed sensor 13 is greater than the motor drive permissible vehicle speed. In the first routine in the cruise mode, the motor drive permissible vehicle speed is set to be the initial value V1.

When the result of the determination in step S101 is "NO" (i.e., the vehicle speed≦V1), the operation proceeds to step S102, in which the motor drive permissible period is determined, with reference to the motor cruise map shown in FIG. 2, depending on the present vehicle speed measured by the vehicle speed sensor 13 and the present SOC measured by the state of charge measuring section 12, and the motor cruise operation is executed for the motor drive permissible period, and then the control operation in this routine is once terminated.

In contrast, when the result of the determination in step S101 is "YES" (i.e., the vehicle speed>V1), the operation proceeds to step S103, in which the motor drive permissible vehicle speed is increased.

Next, the control operation proceeds to step S104, in which it is determined whether the present SOC measured by the state of charge measuring section 12 is greater than the vehicle speed setting SOC (SOCn) that is determined by assuming the present vehicle speed Vn measured by the vehicle speed sensor 13 as the motor drive permissible vehicle speed.

When the result of the determination in step S104 is "NO" (i.e., SOC≦SOCn), the operation proceeds to step S105, in which the cruise charging operation is executed. More specifically, in this case, it is determined that the SOC of the battery 8 is not sufficient to execute the motor cruise operation.

In contrast, when the result of the determination in step S104 is "YES" (i.e., SOC>SOCn), the operation proceeds to step S106, in which the motor drive permissible period is determined, with reference to the motor cruise map shown in FIG. 2, depending on the present vehicle speed measured by the vehicle speed sensor 13 and the present SOC measured by the state of charge measuring section 12, and the motor cruise operation is executed for the motor drive permissible period.

After executing operations in step S105 or step S106, the control operation proceeds to step S107, in which the motor drive permissible vehicle speed that was increased in step S103 is reset to the initial value V1, and the control operation in this routine is once terminated. Accordingly, in this control routine, the motor drive permissible vehicle speed is always the initial value V1 when the operation in step S101 is executed.

The control operation in step S104 may be replaced by an alternative operation in which it is determined whether the present vehicle speed measured by the vehicle speed sensor 13 is greater than the motor drive permissible vehicle speed that is determined by assuming the present SOC measured by the state of charge measuring section 12 as the vehicle speed setting SOC. In this case as well, when the result of determination is "NO", the operation proceeds to step S105, and when the result of determination is "YES", the operation proceeds to step S106.

When the operation in step S106 is executed, the SOC of the battery 8 is gradually decreased because the motor-generator 3 is operated so that electrical energy stored in the battery 8 is consumed. When the SOC of the battery 8 is decreased beyond the width of hysteresis, i.e., to a level below SOCn', the drive mode is switched from the motor cruise mode into the cruise charging mode. By providing hysteresis to the vehicle speed setting SOC in such a manner, it is possible to reliably reduce the SOC of the battery 8 by at least an amount corresponding to hysteresis once the drive mode is in the motor cruise mode, and in addition, a hunting phenomenon, in which the drive mode is frequently switched between the motor cruise mode and the cruise charging mode, may be avoided.

The motor drive permissible period is set so that the SOC of the battery 8 is decreased beyond the width of hysteresis of the vehicle speed setting SOC by single motor cruise operation.

Figure 4:
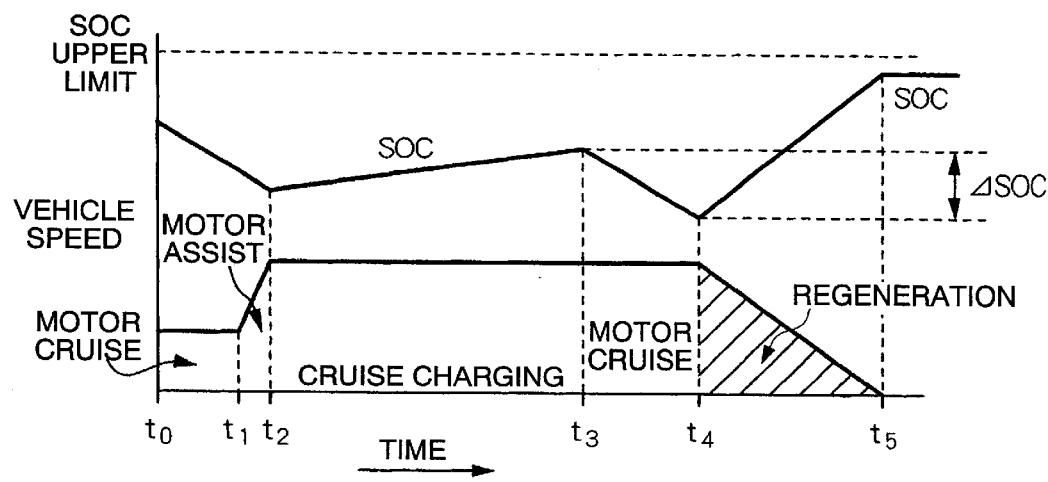
FIG. 4 is a time chart in the first embodiment in which running mode of the vehicle is switched from a cruise mode into a regenerative deceleration mode.
Figure 5:
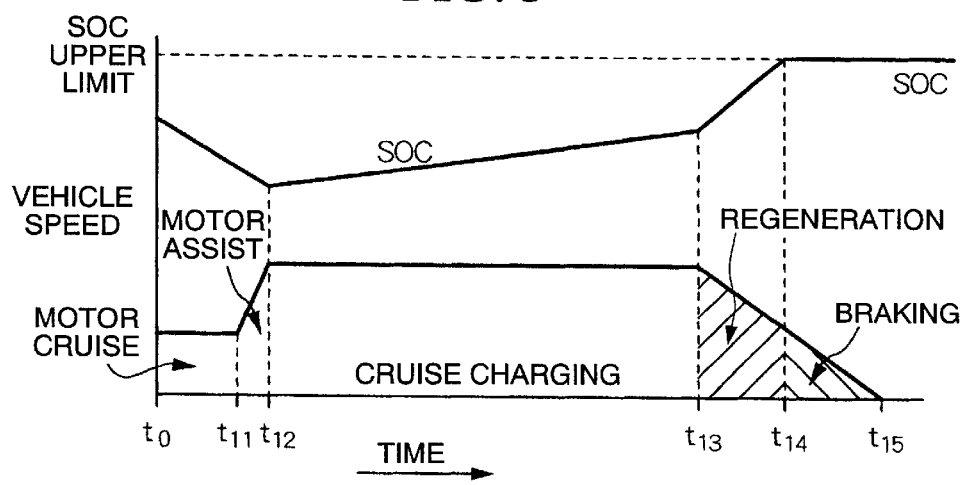
FIG. 5 is a time chart in another example comparative to the first embodiment.

FIGS. 4 and 5 are time charts illustrating changes in SOC of the battery 8 and the vehicle speed in time domain manner in the cases in each of which the regenerative operation is executed in a constant deceleration state from the vehicle speed of 100 km/h which is greater than V1. More specifically, FIG. 4 shows a time chart of the present embodiment, and FIG. 5 shows a time chart of a comparative embodiment.

In the comparative embodiment shown in FIG. 5, the motor drive permissible vehicle speed is set to be a constant value of V1 regardless of the SOC of the battery 8. In this case, the motor cruise operation is executed from time t0 to time t11, the motor assist operation is executed from time 11 to time t12 for accelerating the vehicle, the cruise charging operation at 100 km/h is executed from time 12 to time 13, and the regenerative deceleration operation is executed from time t13. According to the comparative embodiment, because the cruise charging operation is continued even when the SOC of the battery 8 is increased, the SOC of the battery 8 reaches an upper limit in the middle of the regenerative deceleration operation (at time t14), and as a result, the regenerative operation is restrained in order to avoid further charging of the battery 8. After time t14 at which restriction of the regenerative operation begins, deceleration of the vehicle must be enforced by the conventional braking of the vehicle, which means that recoverable energy is dissipated as heat. As a result, the amount of recovered energy is reduced, and fuel economy is degraded.

In contrast, in the case of the first embodiment shown in FIG. 4, the operation from time t1 to time t3 at the middle of the cruise charging operation is the same as in the case of the comparative embodiment; however, when the SOC, which increases due to the cruise charging operation, reaches the vehicle speed setting SOC at time t3, the drive mode is switched from the cruise charging mode to the motor cruise mode, and the motor cruise operation at 100 km/h is executed for the motor drive permissible period so as to reduce the SOC of the battery 8. The motor cruise operation is terminated at time t4. A ΔSOC, which is the decreased amount of SOC, is preliminarily set based on an amount of recoverable energy that is determined depending on the vehicle speed and degree of deceleration. The motor drive permissible period set in the motor cruise map is preliminarily calculated depending on the ΔSOC and electrical power necessary for the motor cruise operation.

According to the above control operation, because energy consumed in the motor cruise operation is determined depending on the vehicle speed and the motor drive permissible period, the SOC of the battery 8 after executing the motor cruise operation may be determined in advance. By determining the SOC of the battery 8 after executing the motor cruise operation so as to be less than a fully charged state by an amount obtainable through the regenerative operation, it is possible to continue the regenerative deceleration operation from time t4 to a time at which the vehicle speed is approximately zero, and thus the battery 8 may be charged to a state in which the SOC thereof is substantially 100%.

According to the above embodiment, because the motor drive permissible vehicle speed is increased when the SOC of the battery 8 is equal to or greater than SOC2, the motor cruise zone may be expanded, and energy may be recovered without decreasing a predicted amount of regeneration, and thus fuel economy may be improved. In addition, because a control to restrain the amount of regeneration need not be executed, the degree of deceleration of the vehicle during regenerative deceleration can be prevented from changing so that the driver may not experience unnatural sensations.

Moreover, because the cylinder deactivation operation is executed in the motor cruise mode, pumping loss of the engine 2 during the motor cruise operation is reduced so that friction of the engine 2 is reduced, and as a result, fuel economy can be improved.

Furthermore, because the motor drive permissible vehicle speed is set so as to be gradually increased, when the SOC of the battery 8 is equal to or greater than SOC2, as the SOC of the battery 8 increases, the SOC may be prevented from being excessively reduced due to execution of the motor cruise operation at a high vehicle speed when the SOC is at a low level.

Second Embodiment

Figure 6:
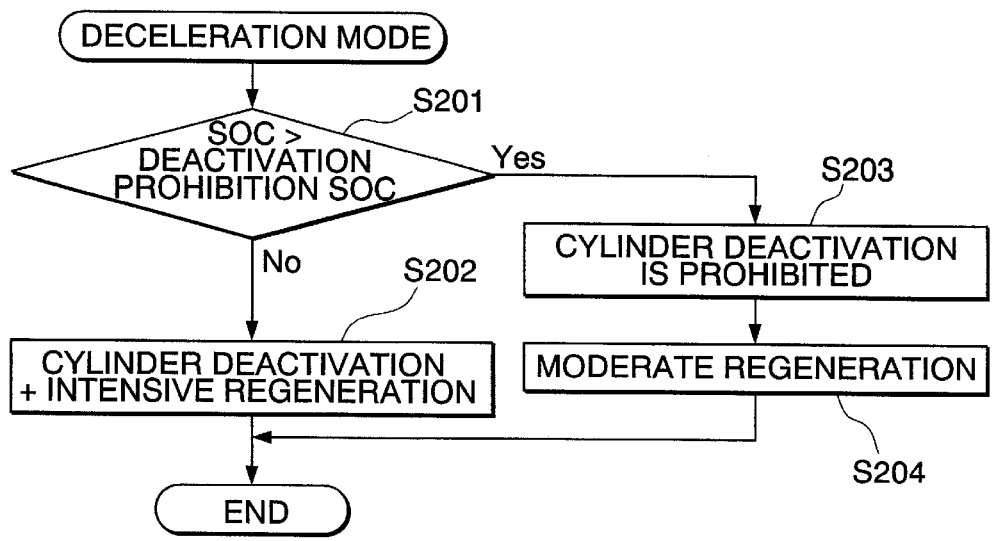
FIG. 6 is a flowchart showing a control operation for a regenerative deceleration operation in a second embodiment of the control device for a hybrid vehicle according to the present invention.
Figure 7:
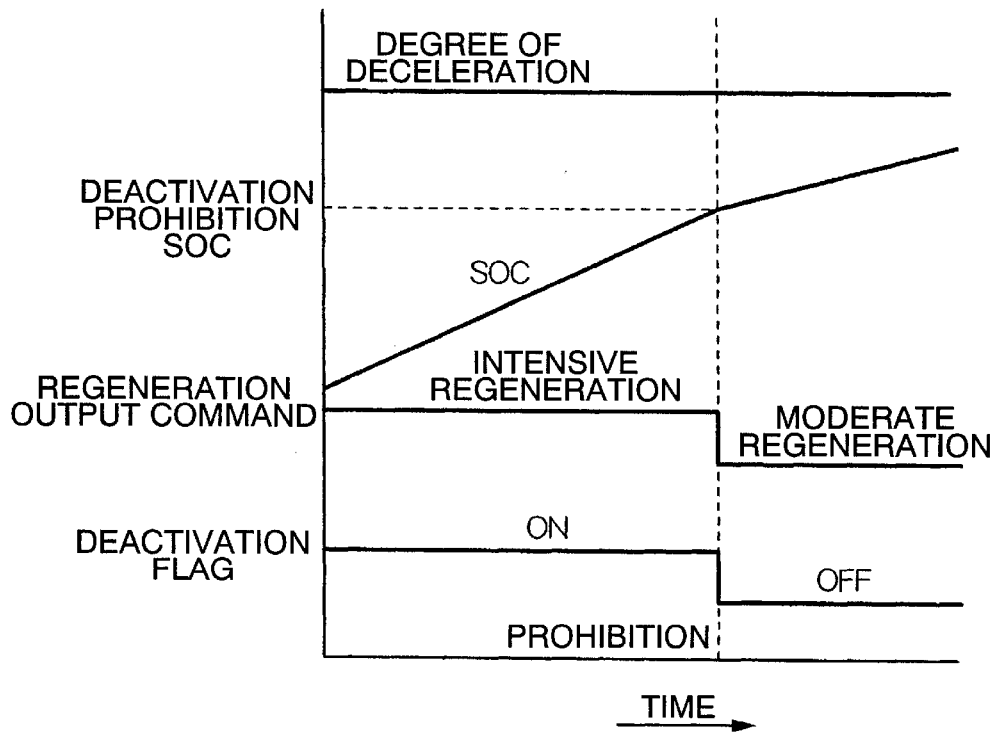
FIG. 7 is a time chart during a regenerative deceleration operation in the second embodiment.
Figure 8:
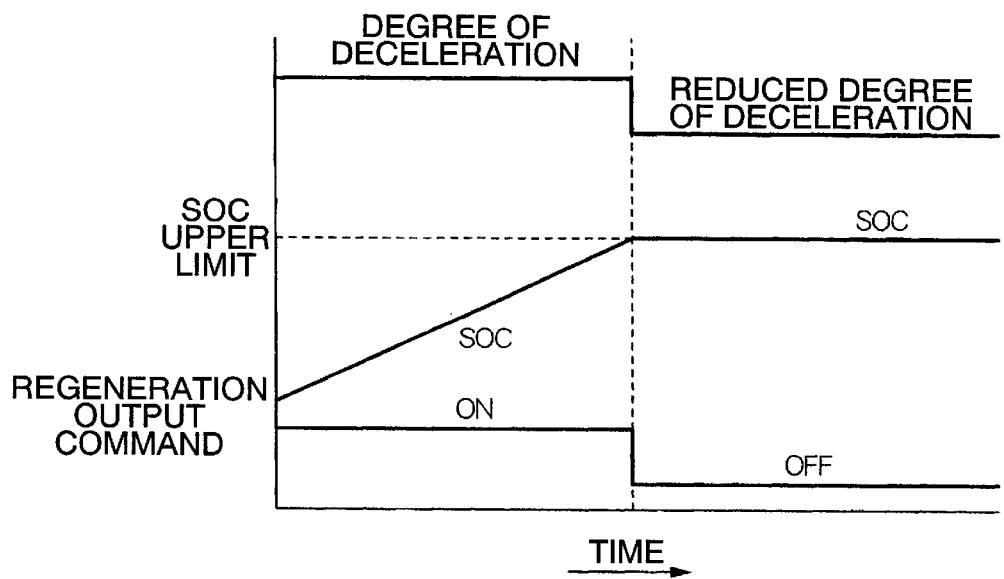
FIG. 8 is a time chart during a regenerative deceleration operation in a conventional hybrid vehicle.

Next, a second embodiment of the control device for a hybrid vehicle according to the present invention will be explained below with reference to FIGS. 6 and 7.

The general structure of the power transmission system of the hybrid vehicle in the second embodiment is the same as that in the first embodiment shown in FIG. 1, and explanation thereof is omitted.

In the second embodiment, engine friction is controlled depending on the SOC of the battery 8 during regenerative deceleration so that the degree of deceleration of the vehicle during regenerative deceleration is prevented from changing.

A control operation for regenerative deceleration operation will be explained with reference to a flowchart shown in FIG. 6.

As the operation enters into the regenerative deceleration mode, in step S201, it is determined whether the SOC measured by the state of charge measuring section 12 is greater than a deactivation prohibition SOC that is set in advance. When the result of the determination in step S201 is "NO" (i.e., SOC≦deactivation prohibition SOC), the operation proceeds to step S202, in which the intake and exhaust valves of all of the cylinders of the engine 2 are maintained to be closed by the intake and exhaust control device 10 so as to execute the cylinder deactivation operation, fuel supply to all of the cylinders of the engine 2 is paused by the fuel injection and ignition control device 11 so as to execute the fuel cut control operation, and an intensive regeneration operation, in which the regenerative output of the motor-generator 3 is set to be a great value by the PDU 7, is executed, and then the control operation in this routine is once terminated.

In contrast, when the result of the determination in step S101 is "YES" (i.e., SOC>deactivation prohibition SOC), the operation proceeds to step S203, in which the cylinder deactivation operation by the intake and exhaust control device 10 is prohibited, and just the fuel cut control operation by the fuel injection and ignition control device 11 is executed.

Then, the operation proceeds to step S204, in which a moderate regeneration operation, in which the regenerative output of the motor-generator 3 is set, by the PDU 7, to be a value less than that in the intensive regeneration control operation, is executed, and then the control operation in this routine is once terminated.

Next, effects obtainable by the control device for a hybrid vehicle according to the second embodiment will be explained below with reference to a time chart during the regenerative deceleration operation shown in FIG. 7.

When the SOC measured by the state of charge measuring section 12 is equal to or less than the deactivation prohibition SOC, the intensive regeneration operation is executed by the motor-generator 3, thereby the SOC of the battery 8 is gradually increased. Because pumping loss of the engine 2 is reduced due to the cylinder deactivation during the intensive regeneration operation, regenerated energy can be increased by an amount corresponding to the reduced pumping loss.

When the SOC reaches the deactivation prohibition SOC, the regenerative output is decreased due to the moderate regeneration operation by the motor-generator 3. Accordingly, the increasing rate of the SOC is reduced than in the intensive regeneration operation.

Because the cylinder deactivation operation is prohibited during the moderate regeneration operation, pumping loss of the engine 2 is increased. The increased engine friction due to prohibition of cylinder deactivation may be compensated for by decreasing the amount of regeneration power; therefore, the degree of deceleration of the vehicle during the moderate regeneration operation may be made the same as in the case of the intensive regeneration operation, and thus the degree of deceleration of the vehicle can be prevented from changing so that the driver may not experience unnatural sensations.

In the second embodiment, the regenerative output (the amount of regeneration) may be controlled, during the moderate regeneration operation, so as to gradually decreased as the SOC of the battery 8 increases. In this case, the increasing rate of the SOC during the moderate regeneration operation may be further reduced.

Advantageous Effects Obtainable by the Invention

As explained above, according to the control device for a hybrid vehicle of the present invention, because, the motor drive zone may be expanded, and because energy may be recovered without decreasing a predicted amount of regeneration, a control to restrain the amount of regeneration need not be executed, and the degree of deceleration of the vehicle during regenerative deceleration can be prevented from changing, and in addition, fuel economy can be improved.

According to another control device for a hybrid vehicle of the present invention, because pumping loss in the engine may be reduced, i.e., the engine friction may be reduced during the motor drive operation, fuel economy can be improved.

According to another control device for a hybrid vehicle of the present invention, the state of charge of the energy storage section may be prevented from being excessively reduced due to drive by the motor at a high vehicle speed when the state of charge of the energy storage section is at a low level.

According to another control device for a hybrid vehicle of the present invention, it is possible to set the motor drive permissible vehicle speed to the initial value i.e., a level before being increased, when the state of charge is reduced.

According to another control device for a hybrid vehicle of the present invention, because the state of charge of the energy storage section may be reduced by at least an amount corresponding to hysteresis when the motor drive mode is selected based on the increased motor drive permissible vehicle speed, it is possible to reliably reduce the state of charge of the energy storage section. In addition, a hunting phenomenon, in which the drive mode is frequently switched into the motor drive mode and switched out of the motor drive mode, may be avoided.

According to another control device for a hybrid vehicle of the present invention, because energy consumed in the motor drive mode is determined depending on the vehicle speed and the motor drive permissible period, the state of charge of the energy storage section after executing drive by the motor can be set in advance.

According to another control device for a hybrid vehicle of the present invention, when the state of charge of the energy storage section is at a low level during regenerative deceleration, it is possible to reduce pumping loss in the engine by executing the cylinder deactivation operation, and thus it is possible to increase regenerated energy by an amount corresponding to the reduced pumping loss. On the other hand, when the state of charge of the energy storage section is at a high level during regenerative deceleration, it is possible to increase pumping loss in the engine by prohibiting the cylinder deactivation operation, and thus it is possible to increase degree of deceleration of the vehicle. Accordingly, the degree of deceleration of the vehicle is prevented from changing even when the amount of regeneration is restrained.

According to another control device for a hybrid vehicle of the present invention, because increase in the engine friction due to prohibition of cylinder deactivation operation may be compensated for by decreasing the amount of regeneration, the degree of deceleration of the vehicle is prevented from changing.

According to another control device for a hybrid vehicle of the present invention, the increasing rate of the state of charge of the energy storage section may be slowed down.

What is claimed is:

1. A control device for a hybrid vehicle which comprises an engine and a motor that is capable of generating electrical power as power sources, and in which the power of at least one of the engine and the motor is transmitted to an output shaft for driving the hybrid vehicle, the control device comprising:

an energy storage section which is capable of supplying energy to the motor;

a state of charge measuring section for measuring the state of charge of the energy storage section; and a drive control section that preliminarily stores information of a motor drive permissible vehicle speed below which a motor drive mode, in which the engine outputs no power and the motor is operated solely for driving the hybrid vehicle, is employed, wherein the drive control section is adapted to control so to increase the motor drive permissible vehicle speed when the state of charge of the energy storage section measured by the state of charge measuring section is equal to or greater than a predetermined value.

2. A control device according to claim 1, wherein the engine is adapted to perform a cylinder deactivation operation, in which the operations of associated intake and exhaust valves are suspended, on at least some of cylinders thereof in the motor drive mode in which the engine outputs no power.

3. A control device according to claim 1, wherein the motor drive permissible vehicle speed is set so as to be gradually increased as the state of charge of the energy storage section increases.

4. A control device according to claim 3, wherein the drive control section is further adapted to control so as to lower the motor drive permissible vehicle speed to the level before being increased when the state of charge of the energy storage section measured by the state of charge measuring section becomes less than the state of charge corresponding to the motor drive permissible vehicle speed after being increased.

5. A control device according to claim 4, wherein the state of charge corresponding to the motor drive permissible vehicle speed after being increased is provided with hysteresis that is set depending on the motor drive permissible vehicle speed.

6. A control device according to claim 1, wherein a motor drive permissible period after the motor drive permissible vehicle speed is increased is preliminarily set depending on the vehicle speed and the state of charge of the energy storage section.

7. A control device for a hybrid vehicle which comprises an engine and a motor that is capable of generating electrical power as power sources, and in which the power of at least one of the engine and the motor is transmitted to an output shaft for driving the hybrid vehicle, the control device comprising:

an energy storage section which is capable of supplying energy to the motor;

a state of charge measuring section for measuring the state of charge of the energy storage section;

a cylinder deactivation executing section which executes a cylinder deactivation operation on at least some of cylinders of the engine by suspending the operations of associated intake and exhaust valves; and a drive control section which is adapted to control the cylinder deactivation executing section, when the motor performs a regenerative operation during deceleration of the hybrid vehicle, so as to execute a cylinder deactivation operation when the state of charge of the energy storage section measured by the state of charge measuring section is equal to or less than a predetermined value, and so as to prohibit a cylinder deactivation operation when the state of charge of the energy storage section measured by the state of charge measuring section is greater than the predetermined value.

8. A control device according to claim 7, wherein the drive control section is further adapted to set the amount of regeneration, when the cylinder deactivation executing section is prohibited to execute a cylinder deactivation operation, to be less than that in a state in which the state of charge is equal to or less than the predetermined value.

9. A control device according to claim 8, wherein the drive control section is further adapted to gradually decrease the amount of regeneration as the state of charge of the energy storage section increases.

* * * * *